July 29, 1952     G. GILMORE     2,605,113
TRAILER
Filed Nov. 7, 1949
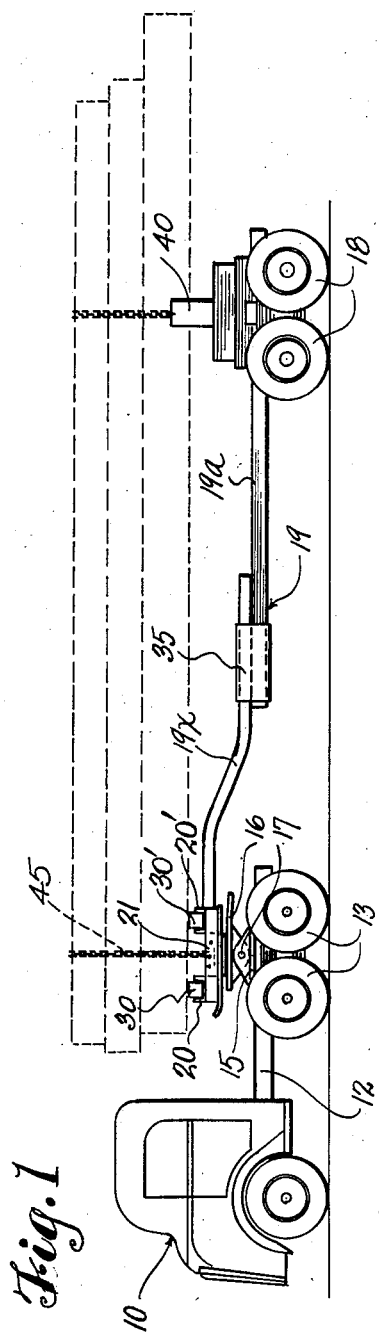
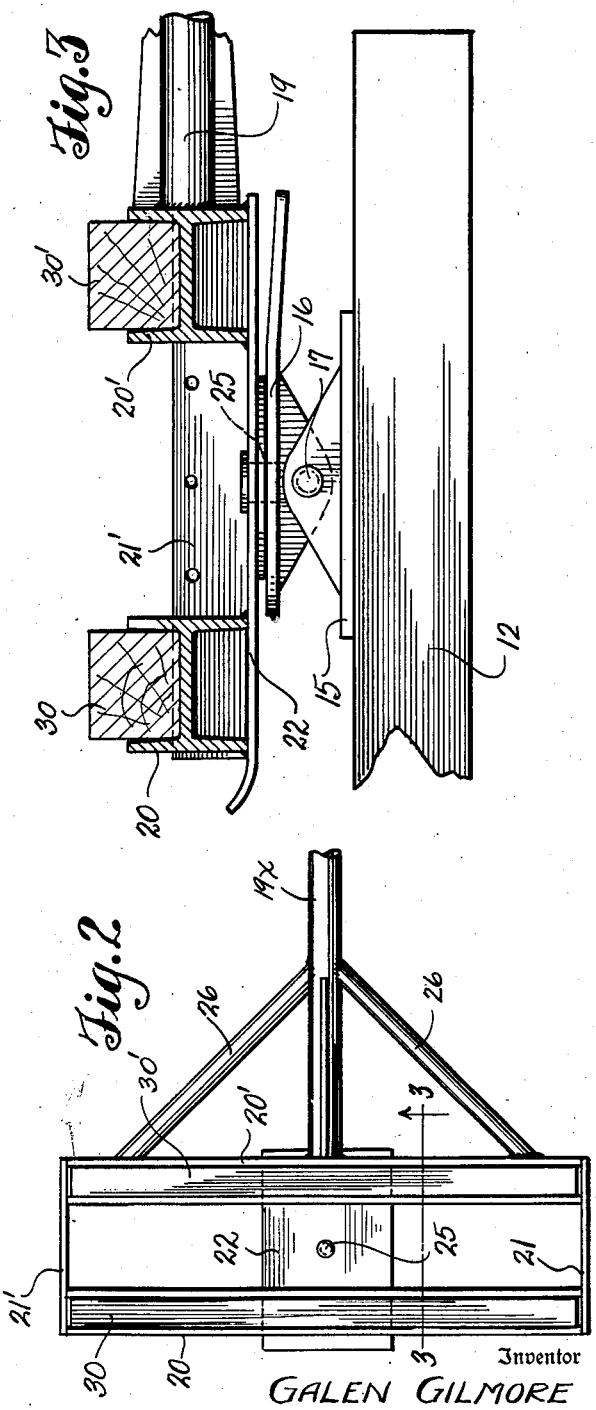
Inventor
GALEN GILMORE
By
Attorney

UNITED STATES PATENT OFFICE 2,605,113

TRAILER

Galen Gilmore, Seattle, Wash.

Application November 7, 1949, Serial No. 125,889

2 Claims. (Cl. 280—33.05)

This invention relates to improvements in vehicles designed for the hauling of long and heavy timbers, logs, beams and the like.

More specifically stated, the present invention pertains to a semi-trailer type of vehicle characterized by an improved form of bunk or bolster, designed for supporting the forward end portions of the logs or timbers that are carried on the vehicle; that will eliminate the tendency of forward shifting of the load or tilting of the bunk or bolster incident to quick starting or to any quick application of brakes to the fast traveling, heavily loaded vehicle.

For a better understanding of the present invention, it will here be explained that in the hauling of long heavy objects, such as logs, beams and the like, it is customary to employ a vehicle of semi-trailer type. Such a trailer is equipped at its rear end with a cross-bunk on which the rear end portions of the logs are supported and secured, and a similar cross-bunk is applied to the truck to which the trailing vehicle is attached, to carry the forward ends of the conveyed objects. The trailer is generally attached to the truck through the mediacy of a reach beam and a clevis. This reach is sometimes disconnected or removed and the rear trucks connected to the truck through the mediacy of the load. When heavy loads are thus being transported, quick stopping or quick starting of the truck is quite apt to cause the load to shift endwise by reason of forward tilting of the supporting bunks, and this, in many instances, has resulted in severe damage to vehicle and driver. It is more practical for such hauling to employ a truck that is equipped with a fifth-wheel for the connection of the trailing vehicle, and it is for use with trucks that are so equipped that the present invention is designed.

In view of the above explanatory matter, it is the principal object of this present invention to provide a vehicle of a semi-trailer type especially designed for the hauling of long heavy objects, which for convenience will herein be referred to as logs, and wherein the reach beam of the trailing vehicle is equipped at its forward end with a novel horizontal frame structure, equipped on its under side with a pivot pin for effecting a draft connection with the fifth wheel of the truck and upon which frame two parallel, spaced apart cross-bunks are mounted as supports for the forward end of the load; these bunks being located, respectively, forwardly and rearwardly of the pivot pin, and by reason of their use, eliminate any tendency of load shifting and bunk tilting or rocking under the inertia of the load in making quick stops or starts.

Another object of the invention is to provide a trailing vehicle for the present uses that is exceptionally serviceable, yet simple in construction and relatively inexpensive to manufacture.

Still further objects of my invention reside in the details of construction and combination of parts, and mode of use of the device as will hereinafter be fully described.

In accomplishing the above-mentioned and other objects of the invention, I have provided the improved details of construction, the preferred forms of which are illustrated in the accompanying drawings wherein:

Fig. 1 is a side view of a log hauling vehicle embodying the improvements of the present invention therein.

Fig. 2 is a top, or plan view of the novel frame structure and parallel bunks as applied to the forward end of the trailer reach.

Fig. 3 is a vertical section, taken on line 3—3 in Fig. 2; the parts being enlarged for better showing.

Referring more in detail to the drawings:

In Fig. 1, 10 designates a common form of prime mover, commonly referred to as a truck, as used in hauling operations such as for the transportation of heavy logs, beams, timbers, etc. The truck has a frame or chassis, designated at 12, which may be of the usual form of construction, and is supported at the rear by the traction and driving wheels 13. Mounted on the rear end portion of the chassis 12, is a fifth-wheel structure comprising a base plate 15 that is rigidly secured to the chassis, a horizontally disposed disk 16 that is pivotally mounted upon the plate 15 by transversely alined pivot pins 17; the plate 6 being formed with a rearwardly opening recess leading into a seat for containing a vertically directed pivot pin, and is equipped also with latching means for retaining the pivot pin functionally in the seat. The fifth-wheel construction may be like or similar to those shown in U. S. Patents Nos. 1,412,025, 1,441,292, 1,479,828 or 1,592,832, and forms no part of the present invention.

The present trailer is shown in Fig. 1 to comprise a supporting set of wheeled trucks 18 at its rear end, connected by means of a reach beam that is designated in its entirety by numeral 19, to the bunk mounting frame structure that overlies and is pivotally attached to the fifth wheel plate 16 as affixed to the truck chassis.

The present bunk mounting frame structure is made up of two horizontally disposed, parallel cross beams 20 and 20', preferably of H-form in cross section, and spaced apart a substantial distance in the longitudinal direction of the trailer. For present-day uses, I prefer that these beams be spaced about two feet apart and are about eight feet long. The two beams 20—20' are rigidly joined across their ends by means of plates 21—21' applied flatly against their end surfaces and welded thereto. Also, these beams 20—20' are joined across their under sides, medially of their ends, by a heavy, flat metal plate 22; this also being welded to the cross beam, as best shown in Fig. 3. Fixed in this plate, centrally of the frame structure and extending downwardly therefrom is a pivot pin 25 whereby the pivotal connection of the trailing vehicle with the fifth-wheel disk 15 is effected.

The forward end portion of the reach beam 19 comprises a tubular, metal beam 19x. This has an upwardly offset forward end portion that is square cut at its forward end and welded rigidly to the rearward flange of the H-beam 20' at a point midway between its ends. Brace bars 26—26 extend angularly from the beam 19x to opposite ends of beam 20' to give additional rigidity to the construction. The reach beam 19x extends perpendicularly from the beam to which it is attached and the frame is held thereby in a plane normally parallel with the plane of the chassis 12 of the truck.

Mounted in the upwardly facing channels of the H-beams 20—20' are wooden bunk beams 30—30. These are co-extensive with the H-beams and extend somewhat above them for the resting thereon of the forward end of the load, as noted in Fig. 1.

The rearward end section of the reach 19 comprises a wooden beam 19a that is fixed in the frame structure of the wheeled trucks 18 and at its forward end is fitted and secured within a sleeve 35 in which the rear end portion of beam 19x is telescopically contained for adjustment in the overall length of the reach. Means is provided to secure the adjustment.

Mounted on the frame structure of the trucks 18 is a cross bunk 40 and on this, the rear end of the load is supported for transportation.

In the hauling of logs, or the like, their forward end portions are extended across both cross beams 30—30' and may be secured thereon, if desired, in the usual or any suitable manner; for example, by means of chain or cable ties 45 secured at their ends to the cross plates 21—21' that join the ends of beams 20—20'. Likewise, the rear ends of the logs may be secured, if desired, to cross bunk 40.

The principal advantages in this construction reside in the fact that the tendency of the forward bunk to tilt or rock forwardly or rearwardly with the sudden stopping or starting, is eliminated, and thus the danger of injury to the truck driver and truck is eliminated. Also, the structure is sturdier and more dependable than the usual arrangement where the reach is connected by a clevis or where the reach connection is permitted to telescope or is removed and the trailing trucks connected only through the mediacy of the load.

Having thus described my invention, what I claim as new therein and desire to secure by Letters Patent is:

1. In a truck and trailer combination including a reach pole extended forwardly from the trailer for connection with the truck; a rectangular frame fixed rigidly to the reach pole at its forward end and horizontally overlying the truck frame, a fifth wheel mechanism pivotally securing the frame to the truck; said frame comprising parallel and coextensive crossbeams disposed forwardly and rearwardly of the fifth wheel pivot axis, said beams being of H-form in cross section, end plates joining the beams across the ends of the frame, and bunks disposed in the upwardly facing channels of the bunk beams to coact in the support of the forward end of a load that is supported at its rear end on the trailer.

2. A structure as in claim 1 wherein the said end plates are formed with holes to adapt them for the attachment of load holding chains thereto.

GALEN GILMORE.

REFERENCES CITED

The following references are of record in the file of this patent:

UNITED STATES PATENTS

| Number | Name | Date |
| --- | --- | --- |
| 1,835,436 | Shaw | Dec. 8, 1931 |
| 2,469,093 | White | May 3, 1949 |

FOREIGN PATENTS

| Number | Country | Date |
| --- | --- | --- |
| 705,343 | Germany | Apr. 24, 1941 |